United States Patent
Shi et al.

(10) Patent No.: US 10,440,616 B2
(45) Date of Patent: Oct. 8, 2019

(54) FAILURE HANDLING METHOD, PACKET DATA NETWORK, MOBILITY MANAGEMENT ENTITY, AND NETWORK SYSTEM

(71) Applicant: Huawei Technologies Co., Ltd., Shenzhen (CN)

(72) Inventors: Xiaoyan Shi, Beijing (CN); Xiaoji Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 15/198,913

(22) Filed: Jun. 30, 2016

(65) Prior Publication Data
US 2016/0316402 A1 Oct. 27, 2016

Related U.S. Application Data

(63) Continuation of application No. PCT/CN2013/090969, filed on Dec. 30, 2013.

(51) Int. Cl.
*H04W 36/00* (2009.01)
*H04W 76/19* (2018.01)
(Continued)

(52) U.S. Cl.
CPC ....... *H04W 36/0055* (2013.01); *H04W 24/04* (2013.01); *H04W 36/165* (2013.01);
(Continued)

(58) Field of Classification Search
CPC ... H04W 88/16; H04W 24/04; H04W 76/028; H04W 76/045; H04W 76/027; H04W 8/30
See application file for complete search history.

(56) References Cited

U.S. PATENT DOCUMENTS

2011/0113278 A1\* 5/2011 Yin .................. H04L 12/4633
714/4.1
2012/0063300 A1 3/2012 Sahin et al.
(Continued)

FOREIGN PATENT DOCUMENTS

CN 101772114 A 7/2010
CN 102137487 A 7/2011
(Continued)

OTHER PUBLICATIONS

"3rd Generation Partnership Project; Technical Specification Group Core Network and Terminals; Study of Evolved Packet Core (EPC) nodes restoration (Release 11)," 3GPP TR 23.857, V11.0.0, pp. 1-66, 3rd Generation Partnership Project, Valbonne, France (Dec. 2012).
(Continued)

*Primary Examiner* — Jung H Park
(74) *Attorney, Agent, or Firm* — Leydig, Voit & Mayer, Ltd.

(57) ABSTRACT

Embodiments of the present invention provide a failure handling method, a packet data network, a mobility management entity, and a network system. The failure handling method includes: receiving, by a packet data network gateway P-GW, downlink data after detecting that a failure occurs in an associated first S-GW; and sending, by the P-GW, a notification message to a mobility management entity MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW. The embodiments of the present invention can prevent a failure recovery procedure
(Continued)

from being executed multiple times, and lighten signaling load.

20 Claims, 7 Drawing Sheets

(51) Int. Cl.
    *H04W 24/04*     (2009.01)
    *H04W 36/16*     (2009.01)
    *H04W 68/02*     (2009.01)
    *H04W 88/08*     (2009.01)
    *H04W 76/32*     (2018.01)
    *H04W 76/11*     (2018.01)

(52) U.S. Cl.
    CPC ........... *H04W 68/02* (2013.01); *H04W 76/19* (2018.02); *H04W 76/11* (2018.02); *H04W 76/32* (2018.02); *H04W 88/08* (2013.01)

(56) References Cited

U.S. PATENT DOCUMENTS

| | | | |
|---|---|---|---|
| 2012/0063437 A1 | 3/2012 | Liang et al. | |
| 2012/0084449 A1* | 4/2012 | Delos Reyes | H04L 61/1511 709/229 |
| 2012/0275430 A1* | 11/2012 | Wang | H04W 24/04 370/331 |
| 2013/0044608 A1 | 2/2013 | Qiang et al. | |
| 2013/0114404 A1* | 5/2013 | Yang | H04W 24/04 370/228 |
| 2013/0201824 A1* | 8/2013 | Venkatachalam | H04W 28/12 370/230 |
| 2014/0254363 A1* | 9/2014 | Tanaka | H04W 28/0226 370/230 |
| 2016/0269224 A1 | 9/2016 | Liu et al. | |

FOREIGN PATENT DOCUMENTS

| | | |
|---|---|---|
| CN | 103202064 A | 7/2013 |
| CN | 103299672 A | 9/2013 |
| RU | 2011145021 A | 5/2013 |
| WO | WO 2013051512 A1 | 4/2013 |
| WO | 2013104111 A1 | 7/2013 |

OTHER PUBLICATIONS

"3$^{rd}$ Generation Partnership Project; Technical Specification Group Core Network and Terminals; Restoration procedures (Release 12)," 3GPP TS 23.007, V12.3.0, pp. 1-85, 3$^{rd}$ Generation Partnership Project, Valbonne, France (Dec. 2013).

"Path failure in S5 interface," 3GPP TSG CT4 Meeting #64, Guangzhou, China, C4-140xyz, 3$^{rd}$ Generation Partnership Project, Valbonne, France (Jan. 20-24, 2014).

"PGW ID in the PGW Downlink Triggering Notification," 3GPP TSG CT4 Meeting #64, Guangzhou, China, C4-140123, 3$^{rd}$ Generation Partnership Project, Valbonne, France (Jan. 20-24, 2014).

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.3.0, pp. 1-302, 3$^{rd}$ Generation Partnership Project, Valbonne, France (Dec. 2013).

"3$^{rd}$ Generation Partnership Project; Technical Specification Group Core Network and Terminals; Policy and Charging Control (PCC); Reference points (Release 12)," 3GPP TS 29.212, V12.3.0, pp. 1-217, 3$^{rd}$ Generation Partnership Project, Valbonne, France (Dec. 2012).

"3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274, V12.3.0, pp. 1-236, 3$^{rd}$ Generation Partnership Project, Valbonne, France (Dec. 2013).

* cited by examiner

FAILURE HANDLING METHOD, PACKET DATA NETWORK, MOBILITY MANAGEMENT ENTITY, AND NETWORK SYSTEM

CROSS-REFERENCE TO RELATED APPLICATIONS

This application is a continuation of International Application No. PCT/CN2013/090969, filed on Dec. 30, 2013, which is hereby incorporated by reference in its entirety.

TECHNICAL FIELD

Embodiments of the present invention relate to communications technologies, and in particular, to a failure handling method, a packet data network, a mobility management entity, and a network system.

BACKGROUND

To enhance a competitive advantage of a future network, in an R8 phase, the 3rd Generation Partnership Project (3GPP starts Long Term Evolution (LTE) and System Architecture Evolution (SAE) projects, and formulates an evolved packet system (EPS) network architecture that includes an LTE radio access network and an SAE system architecture.

The EPS network architecture includes an evolved packet core (EPC), a base station (eNode B), and user equipment (UE). The EPC mainly includes network element devices such as a mobility management entity (MME), a serving gateway (S-GW), and a packet data network gateway (P-GW).

When detecting that a path failure occurs on a connection to a peer device, the S-GW and the P-GW both execute a failure recovery procedure, including a solution in which the P-GW performs failure recovery first and a solution in which the S-GW performs failure recovery first. For the solution in which the P-GW executes failure recovery first, the P-GW establishes a packet data network (PDN) connection to a reselected S-GW by means of failure recovery executed first. In this case, the MIME automatically rejects a failure recovery request submitted by the S-GW. For the solution in which the S-GW executes failure recovery first, a PDN connection is established to a reselected P-GW by means of failure recovery executed first by the S-GW. However, when receiving a downlink data packet, the P-GW still sends a downlink triggering notification message to the MME by using the reselected S-GW, and for the downlink triggering message sent by the original P-GW, the MME still executes the failure recovery procedure. As a result, the failure recovery procedure is executed multiple times.

In the prior art, in a case in which an S-GW and a P-GW both detect that a path failure occurs on a connection to a peer device and the original S-GW establishes a PDN connection by means of failure recovery executed first, a failure recovery procedure is executed multiple times, bringing unnecessary signaling load.

SUMMARY

Embodiments of the present invention provide a failure handling method, a packet data network, a mobility management entity, and a network system, to resolve a problem in the prior art that signaling load is heavy.

According to a first aspect, an embodiment of the present invention provides a failure handling method, including:

receiving, by a packet data network gateway P-GW, downlink data after detecting that a failure occurs in an associated first S-GW; and sending, by the P-GW, a notification message to a mobility management entity MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW.

According to the first aspect, in a first possible implementation manner of the first aspect, the identifier of the P-GW is included by the P-GW to the notification message, or is included by the second S-GW to the notification message.

According to the first aspect or the first possible implementation manner of the first aspect, in a second possible implementation manner of the first aspect, the notification message includes:

a downlink triggering notification message for GPRS tunnel protocol, or an update notification message for proxy mobile IP PMIP.

According to any one of the first aspect to the second possible implementation manner of the first aspect, in a third possible implementation manner of the first aspect, the identifier of the P-GW includes at least one of the following identifiers:

an Internet Protocol IP address, a fully qualified tunnel endpoint identifier F-TEID, and a fully qualified domain name FQDN of the P-GW.

According to any one of the first aspect to the third possible implementation manner of the first aspect, in a fourth possible implementation manner of the first aspect, after the sending, by the P-GW, a notification message to an MME by using a second S-GW, the method further includes:

receiving, by the P-GW, a notification response message that is sent by the MME by using the second S-GW, where the notification response message includes rejection indication information and the identifier of the user; and deleting, by the P-GW according to the rejection indication information, context information corresponding to the context identifier of the user.

According to the fourth possible implementation manner of the first aspect, in a fifth possible implementation manner of the first aspect, the rejection indication information includes a reject cause value.

According to any one of the first aspect to the third possible implementation manner of the first aspect, in a sixth possible implementation manner of the first aspect, after the sending, by the P-GW, a notification message to an MME by using a second S-GW, the method further includes:

receiving, by the P-GW, a delete session request message that is sent by the MME by using the second S-GW, where the delete session request message includes the identifier of the user; and deleting, by the P-GW according to the delete session request message, context information corresponding to the context identifier of the user.

According to a second aspect, an embodiment of the present invention further provides a failure handling method, including:

receiving, by an MME, a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data; and when determining that the identifier of the P-GW included in the notification message is different from a P-GW identifier corresponding to a context identifier of the user, refusing, by the MME, to initiate a procedure for recovering from the failure in the first S-GW.

According to the second aspect, in a first possible implementation manner of the second aspect, the identifier of the P-GW is included by the P-GW to the notification message, or is included by the second S-GW to the notification message.

According to the second aspect or the first possible implementation manner of the second aspect, in a second possible implementation manner of the second aspect, the notification message includes: a downlink triggering notification message for GPRS tunnel protocol, or an update notification message of the PMIP.

According to the second aspect to the second possible implementation manner of the second aspect, in a third possible implementation manner of the second aspect, the identifier of the P-GW includes at least one of the following identifiers:

an IP address, an F-TEID, and an FQDN of the P-GW.

According to the second aspect to the third possible implementation manner of the second aspect, in a fourth possible implementation manner of the second aspect, after the receiving, by an MME, a notification message that is sent by a P-GW by using a second S-GW, the method further includes:

sending, by the MME, a notification response message to the P-GW by using the second S-GW, where the notification response message includes rejection indication information and the identifier of the user, so that the P-GW deletes, according to the rejection indication information, context information corresponding to the context identifier of the user.

According to the fourth possible implementation manner of the second aspect, in a fifth possible implementation manner of the second aspect, the rejection indication information includes a reject cause value.

According to any one of the second aspect to the third possible implementation manner of the second aspect, in a sixth possible implementation manner of the second aspect, after the receiving, by an MME, a notification message that is sent by a P-GW by using a second S-GW, the method further includes:

sending, by the MME, a delete session request message to the P-GW by using the second S-GW, where the delete session request message includes the identifier of the user, so that the P-GW deletes, according to the delete session request message, context information corresponding to the context identifier of the user.

According to a third aspect, an embodiment of the present invention further provides a packet data network gateway, including:

a receiving module, configured to receive downlink data after detecting that a failure occurs in an associated first S-GW; and a sending module, configured to send a notification message to a mobility management entity MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW.

According to the third aspect, in a first possible implementation manner of the third aspect, the identifier of the P-GW is included by the P-GW to the notification message, or is included by the second S-GW to the notification message.

According to the third aspect or the first possible implementation manner of the third aspect, in a second possible implementation manner of the third aspect, the notification message includes: a downlink triggering notification message for GPRS tunnel protocol, or an update notification message of the PMIP.

According to the third aspect to the second possible implementation manner of the third aspect, in a third possible implementation manner of the third aspect, the identifier of the P-GW includes at least one of the following identifiers:

an IP address, an F-TEID, and an FQDN of the P-GW.

According to the third aspect to the third possible implementation manner of the third aspect, in a fourth possible implementation manner of the third aspect, the receiving module is further configured to: after the sending module sends the notification message to the MME by using the second S-GW, receive a notification response message that is sent by the MME by using the second S-GW, where the notification response message includes rejection indication information and the identifier of the user; and the P-GW further includes:

a first processing module, configured to delete, according to the rejection indication information, context information corresponding to the context identifier of the user.

According to the fourth possible implementation manner of the third aspect, in a fifth possible implementation manner of the third aspect, the rejection indication information includes a reject cause value.

According to the third aspect to the third possible implementation manner of the third aspect, in a sixth possible implementation manner of the third aspect, the receiving module is further configured to: after the sending module sends the notification message to the MME by using the second S-GW, receive a delete session request message that is sent by the MME by using the second S-GW, where the delete session request message includes the identifier of the user; and the P-GW further includes:

a second processing module, configured to delete, according to the delete session request message, context information corresponding to the context identifier of the user.

According to a fourth aspect, an embodiment of the present invention further provides a mobility management entity, including:

a receiving module, configured to receive a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data; and a processing module, configured to: when determining that the identifier of the P-GW included in the notification message is different from a P-GW identifier corresponding to a context identifier of the user, refuse to initiate a procedure for recovering from the failure in the first S-GW.

According to the fourth aspect, in a first possible implementation manner of the fourth aspect, the identifier of the P-GW is included by the P-GW to the notification message, or is included by the second S-GW to the notification message.

According to the fourth aspect or the first possible implementation manner of the fourth aspect, in a second possible implementation manner of the fourth aspect, the notification message includes: a downlink triggering notification message for GPRS tunnel protocol, or an update notification message of the PMIP.

According to any one of the fourth aspect to the second possible implementation manner of the fourth aspect, in a third possible implementation manner of the fourth aspect, the identifier of the P-GW includes at least one of the following identifiers:

an IP address, an F-TEID, and an FQDN of the P-GW.

According to any one of the fourth aspect to the third possible implementation manner of the fourth aspect, in a fourth possible implementation manner of the fourth aspect, the MME further includes:

a first sending module, configured to: after the receiving module receives the notification message that is sent by the P-GW by using the second S-GW, send a notification response message to the P-GW by using the second S-GW, where the notification response message includes rejection indication information and the identifier of the user, so that the P-GW deletes, according to the rejection indication information, context information corresponding to the context identifier of the user.

According to the fourth possible implementation manner of the fourth aspect, in a fifth possible implementation manner of the fourth aspect, the rejection indication information includes a reject cause value.

According to any one of the fourth aspect to the third possible implementation manner of the fourth aspect, in a sixth possible implementation manner of the fourth aspect, the MME further includes:

a second sending module, configured to: after the receiving module receives the notification message that is sent by the P-GW by using the second S-GW, send a delete session request message to the P-GW by using the second S-GW, where the delete session request message includes the identifier of the user, so that the P-GW deletes, according to the delete session request message, context information corresponding to the context identifier of the user.

According to a fifth aspect, an embodiment of the present invention further provides a P-GW, including: a receiver, a transmitter, and a processor, where the receiver is configured to receive downlink data after detecting that a failure occurs in an associated first S-GW; and the transmitter is configured to send a notification message to an MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW.

According to the fifth aspect, in a first possible implementation manner of the fifth aspect, the identifier of the P-GW is included by the P-GW to the notification message, or is included by the second S-GW to the notification message.

According to the fifth aspect or the first possible implementation manner of the fifth aspect, in a second possible implementation manner, the notification message includes:

a downlink triggering notification message for GPRS tunnel protocol, or an update notification message for proxy mobile IP PMIP.

According to the fifth aspect to the second possible implementation manner of the fifth aspect, in a third possible implementation manner of the fifth aspect, the identifier of the P-GW includes at least one of the following identifiers:

an Internet Protocol IP address, a fully qualified tunnel endpoint identifier F-TEID, and a fully qualified domain name FQDN of the P-GW.

According to the fifth aspect to the third possible implementation manner of the fifth aspect, in a fourth possible implementation manner of the fifth aspect, the receiver is further configured to: after the transmitter sends the notification message to the MME by using the second S-GW, receive a notification response message that is sent by the MME by using the second S-GW, where the notification response message includes rejection indication information and the identifier of the user; and the processor is configured to delete, according to the rejection indication information, context information corresponding to the context identifier of the user.

According to the fourth possible implementation manner of the fifth aspect, in a fifth possible implementation manner of the fifth aspect, the rejection indication information includes a reject cause value.

According to the fifth aspect to the third possible implementation manner of the fifth aspect, in a sixth possible implementation manner of the fifth aspect, the receiver is further configured to: after the transmitter sends the notification message to the MME by using the second S-GW, receive a delete session request message that is sent by the MME by using the second S-GW, where the delete session request message includes the identifier of the user; and the processor is configured to delete, according to the delete session request message, context information corresponding to the context identifier of the user.

According to a sixth aspect, an embodiment of the present invention further provides an MME, including: a receiver, a transmitter, and a processor, where the receiver is configured to receive a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data; and the processor is configured to: when determining that the identifier of the P-GW included in the notification message is different from a P-GW identifier corresponding to a context identifier of the user, refuse to initiate a procedure for recovering from the failure in the first S-GW.

According to the sixth aspect, in a first possible implementation manner of the sixth aspect, the identifier of the P-GW is included by the P-GW to the notification message, or is included by the second S-GW to the notification message.

According to the sixth aspect or the first possible implementation manner of the sixth aspect, in a second possible implementation manner of the sixth aspect, the notification message includes: a downlink triggering notification message for GPRS tunnel protocol, or an update notification message of the PMIP.

According to any one of the sixth aspect to the second possible implementation manner of the sixth aspect, in a third possible implementation manner of the sixth aspect, the identifier of the P-GW includes at least one of the following identifiers:

an IP address, an F-TEID, and an FQDN of the P-GW.

According to any one of the sixth aspect to the third possible implementation manner of the sixth aspect, in a fourth possible implementation manner of the sixth aspect, the transmitter is configured to send a notification response message to the P-GW by using the second S-GW, where the notification response message includes rejection indication information and the identifier of the user, so that the P-GW deletes, according to the rejection indication information, context information corresponding to the context identifier of the user.

According to the fourth possible implementation manner of the sixth aspect, in a fifth possible implementation manner of the sixth aspect, the rejection indication information includes a reject cause value.

According to any one of the sixth aspect to the third possible implementation manner of the sixth aspect, in a sixth possible implementation manner of the sixth aspect, the transmitter is configured to send a delete session request message to the P-GW by using the second S-GW, where the delete session request message includes the identifier of the user, so that the P-GW deletes, according to the delete session request message, context information corresponding to the context identifier of the user.

According to a seventh aspect, an embodiment of the present invention further provides a network system, including at least: the P-GW according to any one of the possible implementation manners of the third aspect and the MME according to any one of the possible implementation manners of the fourth aspect.

According to an eighth aspect, an embodiment of the present invention further provides a network system, including at least: the P-GW according to any one of the possible implementation manners of the fifth aspect and the MME according to any one of the possible implementation manners of the sixth aspect.

According to the failure handling method, the packet data network gateway, the mobility management entity, and the network system that are provided in the embodiments of the present invention, a notification message sent by a P-GW to an MME carries an identifier of the P-GW, so that when determining through comparison that the identifier of the P-GW is different from a P-GW identifier corresponding to a context identifier of UE, the MME may refuse to initiate a procedure for recovering from a failure in the first S-GW, thereby preventing the failure recovery procedure from being executed multiple times, and lightening signaling load.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
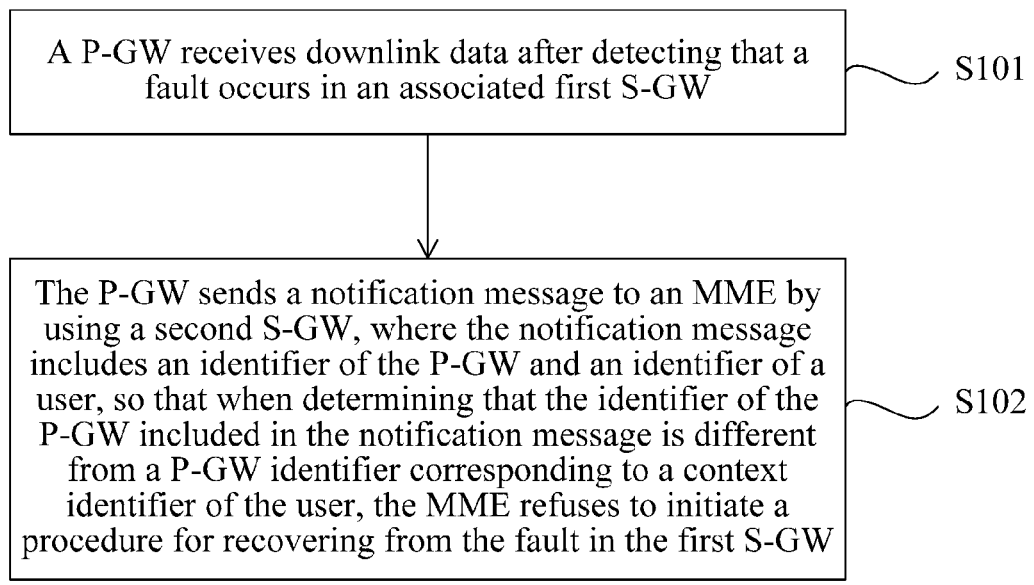
FIG. 1 is a flowchart of a failure handling method according to Embodiment 1 of the present invention.

FIG. 1 is a flowchart of a failure handling method according to Embodiment 1 of the present invention. The method in this embodiment applies to a case in which in an EPS network system, an S-GW and a P-GW both detect that a path failure occurs on a connection to a peer device and the S-GW establishes a PDN connection by means of failure recovery executed first. The method is executed by the P-GW, and is generally implemented in a hardware and/or software manner. The method in this embodiment includes the following steps:

Step 101: The P-GW receives downlink data after detecting that a failure occurs in an associated first S-GW.

Step 102: The P-GW sends a notification message to an MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW.

Figure 2:
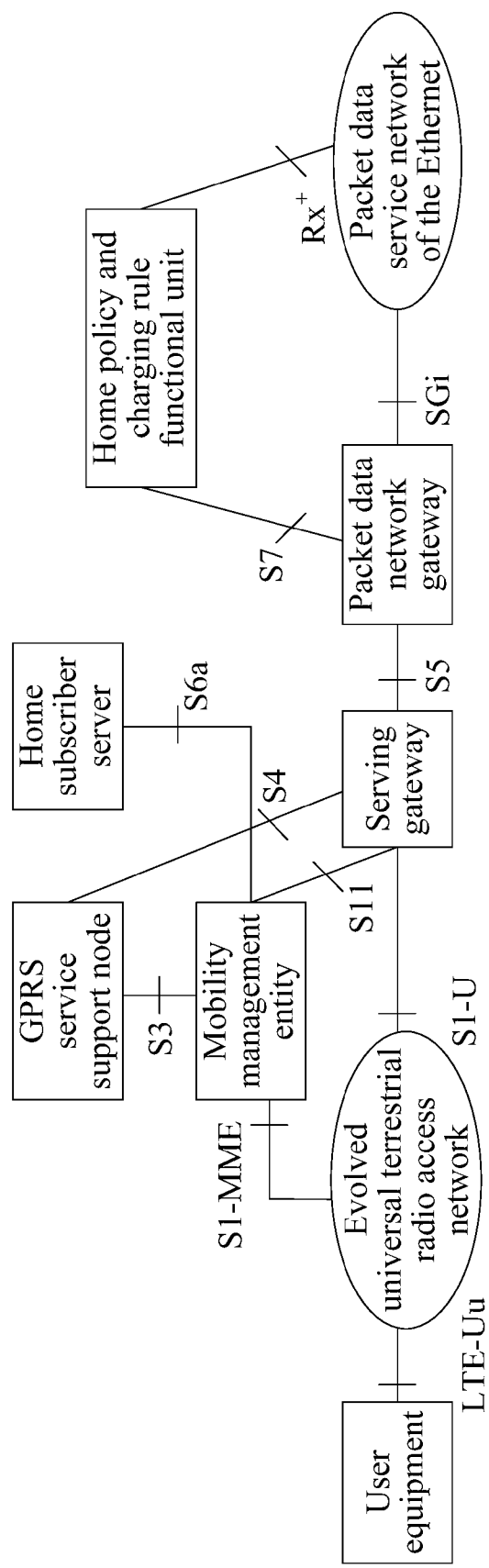
FIG. 2 is a schematic structural diagram of an EPS wireless network to which the method according to Embodiment 1 of the present invention applies.

FIG. 2 is a schematic structural diagram of an EPS wireless network to which the method provided by Embodiment 1 of the present invention applies. As shown in FIG. 2, a UE may establish a PDN connection by means of general packet radio service (GPRS) attachment, that is, an Attach process, to transmit charging information, a rate control message, or the like. The UE can receive service data from an external data network such as a packet data network of the Ethernet by using the PDN connection established in an EPS network architecture shown in FIG. 2 and by using an evolved base station (E-Node B), an S-GW, and a P-GW of a cell in which the UE is located, which are included on an evolved universal terrestrial radio access network (Evolved Universal Terrestrial Radio Access Network, E-UTRAN for short), where the service data may be Internet Protocol (IP) service data such as IP multimedia data and IP telephony service data. In addition, the UE can send uplink data, a request message, or the like to the external data network by using the PDN connection. If a failure occurs in any device on a transmission channel of the PDN connection, the UE cannot normally receive related service data. This embodiment of the present invention mainly resolves a failure that occurs on a transmission path between the S-GW and the P-GW in the PDN connection.

That the P-GW detects that a failure occurs in an associated first S-GW is that the P-GW detects that a path failure occurs on a connection to an associated device, that is, the first S-GW. When detecting that the path failure occurs in the first S-GW, the P-GW may perform the detection by using a message retransmission mechanism. For example, the P-GW may send a first message to the first S-GW and start a timer at the same time. If the timer times out and the P-GW has not received a response message of the first message, the P-GW starts the transmission mechanism. If transmission of the first message by the P-GW exceeds a retransmission threshold, the P-GW detects that a path failure occurs on the connection to the associated device, that is, the first S-GW. Correspondingly, the first S-GW may detect a path failure of the P-GW by using a similar method, and details are not provided again herein.

The downlink data received by the P-GW after the P-GW detects that the failure occurs in the associated first S-GW may be IP service data sent by an external data network. The IP service data may be IP service data corresponding to an EPS bearer, which is created by the MME, of the UE associated with the P-GW and the first S-GW.

After detecting that the failure occurs in the associated first S-GW, the P-GW first reserves context information corresponding to the PDN connection associated with the first S-GW. When receiving the downlink data sent by the external data network, the P-GW reselects an S-GW, that is, the second S-GW, and sends the notification message to the MME by using the second S-GW. That the P-GW sends the notification message to the MME by using the second S-GW refers to that the P-GW sends the notification message to the second S-GW and the second S-GW forwards the notification message to the MME.

The identifier of the P-GW included in the notification message may be any identifier that can represent the P-GW. Different P-GWs have different P-GW identifiers. The identifier of the user included in the notification message may be an identifier of user equipment (UE), for example, an international mobile subscriber identification number (IMSI).

In the EPS network architecture shown in FIG. 2, the MME is mainly responsible for all functions of a control plane for UE session management, including access stratum signaling, security signaling, selection of a P-GW and an S-GW, and the like. When the P-GW and the first S-GW both detect that a path failure exists on a connection to a peer device, the two both execute a failure recovery procedure. However, the P-GW triggers the execution only when receiving downlink data sent by an external data network. Therefore, usually, before the P-GW receives the downlink data sent by the external data network and triggers execution of the failure recovery procedure, the first S-GW first executes the failure recovery procedure. After the first S-GW establishes a PDN connection to a reselected P-GW by means of the failure recovery procedure, the MME updates corresponding information. That the first S-GW has established the PDN connection to the reselected P-GW by means of failure recovery means that an IP service corresponding to the UE is already mapped to the reselected P-GW; therefore, a P-GW identifier corresponding to an context identifier of the UE stored in the MME is an identifier of the P-GW reselected by the first S-GW.

After receiving the notification message sent by the P-GW, the MME discovers through comparison that the identifier of the P-GW included in the notification message is different from the P-GW identifier corresponding to the context identifier of the user, and then the MME can determine that the PDN connection corresponding to the context identifier is already updated to the P-GW reselected by the first S-GW, that is, the PDN connection already recovers from the path failure, and the failure recovery procedure does not need to be executed again. Therefore, the MME may refuse to initiate the procedure for recovering from the failure in the first S-GW, thereby preventing the failure recovery procedure from being executed multiple times, and lightening signaling load.

According to the failure handling method provided in this embodiment, a notification message sent by a P-GW to an MME carries an identifier of the P-GW, so that when determining through comparison that the identifier of the P-GW is different from a P-GW identifier corresponding to a context identifier of UE, the MME may refuse to initiate a procedure for recovering from a failure in the first S-GW, thereby preventing the failure recovery procedure from being executed multiple times, and lightening signaling load.

On the basis of the solution provided in the foregoing embodiment, this embodiment further provides a failure handling method.

In the solution in the foregoing embodiment, the identifier of the P-GW is included by the P-GW to the notification message, or is included by the second S-GW to the notification message.

Specifically, the identifier of the P-GW may be included by the P-GW to the notification message before being sent to the second S-GW, and is then forwarded to the MME by the second S-GW; or the notification message sent by the P-GW to the second S-GW is similar to a message in the prior art, and before the notification message is sent to the MME by using the second S-GW, the second S-GW may acquire, according to the notification message, an identifier of a transmit end of this message, that is, the identifier of the P-GW then add the identifier of the P-GW to the notification message, and send the notification message to the MME.

A specific position at which the identifier of the P-GW is included to the notification message is not limited in this embodiment. The identifier of the P-GW may be included to a header of the notification message, or may be included to a predetermined flag bit of message content.

The notification message in the foregoing solution includes: a downlink triggering notification message for GPRS tunnel protocol, or an update notification message for proxy mobile IP PMIP.

When the notification message includes a downlink triggering notification message for GPRS tunnel protocol (GTP), the notification message includes an identifier of the MME in addition to the identifier of the P-GW and the IMSI. The identifier of the MME may identify a specific MME device associated with the context identifier.

For a UE in a movement process, the notification message may include an update notification message for proxy mobile IP (PMIP).

In the foregoing solution, the identifier of the P-GW includes at least one of the following identifiers:

an Internet Protocol IP address, a fully qualified tunnel endpoint identifier F-TEID, and a fully qualified domain name FQDN of the P-GW.

The identifier of the P-GW may be represented by the IP address of the P-GW, the fully qualified tunnel endpoint identifier (F-TEID), or the fully qualified domain name (FQDN). The F-TEID includes the IP address and a TEID of the P-GW, where the F-TEID is a TEID used for the control plane; and the FQDN includes a device name of the P-GW and all qualified domain names.

On the basis of the solution in the foregoing embodiment, as for a manner for adding the identifier of the P-GW to the notification message, a type of the notification message, and a type of the identifier of the P-GW in the notification message, this embodiment provides multiple specific exemplary implementable solutions, thereby better lightening a signaling bearer of an MME.

Figure 3:
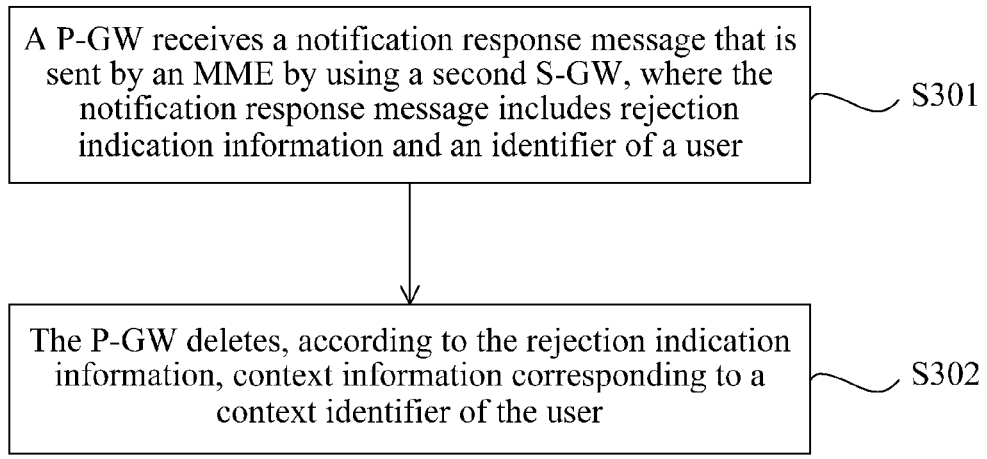
FIG. 3 is a flowchart of a failure handling method according to Embodiment 3 of the present invention.

Embodiment 3 of the present invention further provides a failure handling method. FIG. 3 is a flowchart of a failure handling method according to Embodiment 3 of the present invention. In the foregoing embodiment, after step 102 in which the P-GW sends the notification message to the MME by using the reselected second S-GW, the method further includes:

Step 301: The P-GW receives a notification response message that is sent by the MME by using the second S-GW, where the notification response message includes rejection indication information and an identifier of a user.

Step 302: The P-GW deletes, according to the rejection indication information, context information corresponding to a context identifier of the user.

Specifically, the rejection indication information and the identifier of the user may be carried in a message header of the notification response message and/or a predetermined bit of message content. For example, the rejection indication information may be represented by setting a predetermined bit to 0. That the P-GW deletes the context information corresponding to the context identifier of the user may be that the P-GW releases bearer information corresponding to the context identifier of the user. The context information corresponding to the context identifier of the user may be an IP address that is allocated by the P-GW to a UE and corresponds to the context identifier.

In the foregoing solution, the rejection indication information includes a reject cause value.

For a cause for which the MME refuses to initiate a procedure for recovering from a failure in a first S-GW, different reject causes may be indicated by using different values. In this embodiment, a cause for rejection may be that identifiers are different, and may be indicated by using a predetermined cause value.

Figure 4:
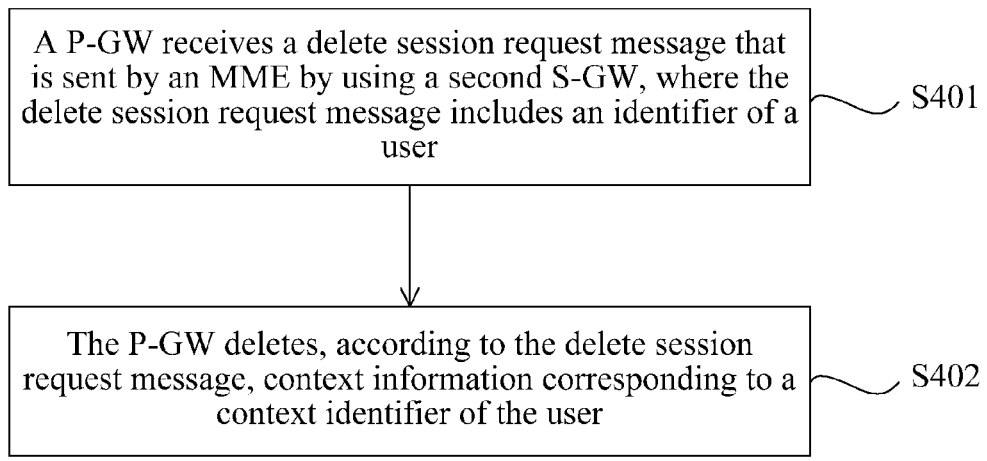
FIG. 4 is a flowchart of another failure handling method according to Embodiment 3 of the present invention.

FIG. 4 is a flowchart of another failure handling method according to Embodiment 3 of the present invention.

Alternatively, in the solution in the foregoing embodiment, after step 102 in which the P-GW sends the notification message to the MME by using the second S-GW, the method further includes:

Step 401: The P-GW receives a delete session request message that is sent by the MME by using the second S-GW, where the delete session request message includes an identifier of a user.

Step 402: The P-GW deletes, according to the delete session request message, context information corresponding to a context identifier of the user.

Specifically, that the P-GW deletes the context information corresponding to the context identifier of the user is that the P-GW releases a bearer corresponding to the context identifier. The deletion may be performed by deleting a session corresponding to the context identifier of the user. The identifier of the user included in the delete session request message may be an IMSI.

On the basis of the foregoing solution, in the solution of this embodiment, a bearer of the P-GW is released in different manners, the P-GW does not send unnecessary signaling when receiving downlink data, and the second S-GW does not need to forward unnecessary signaling, thereby lightening a signaling bearer of an entire network system.

Figure 5:
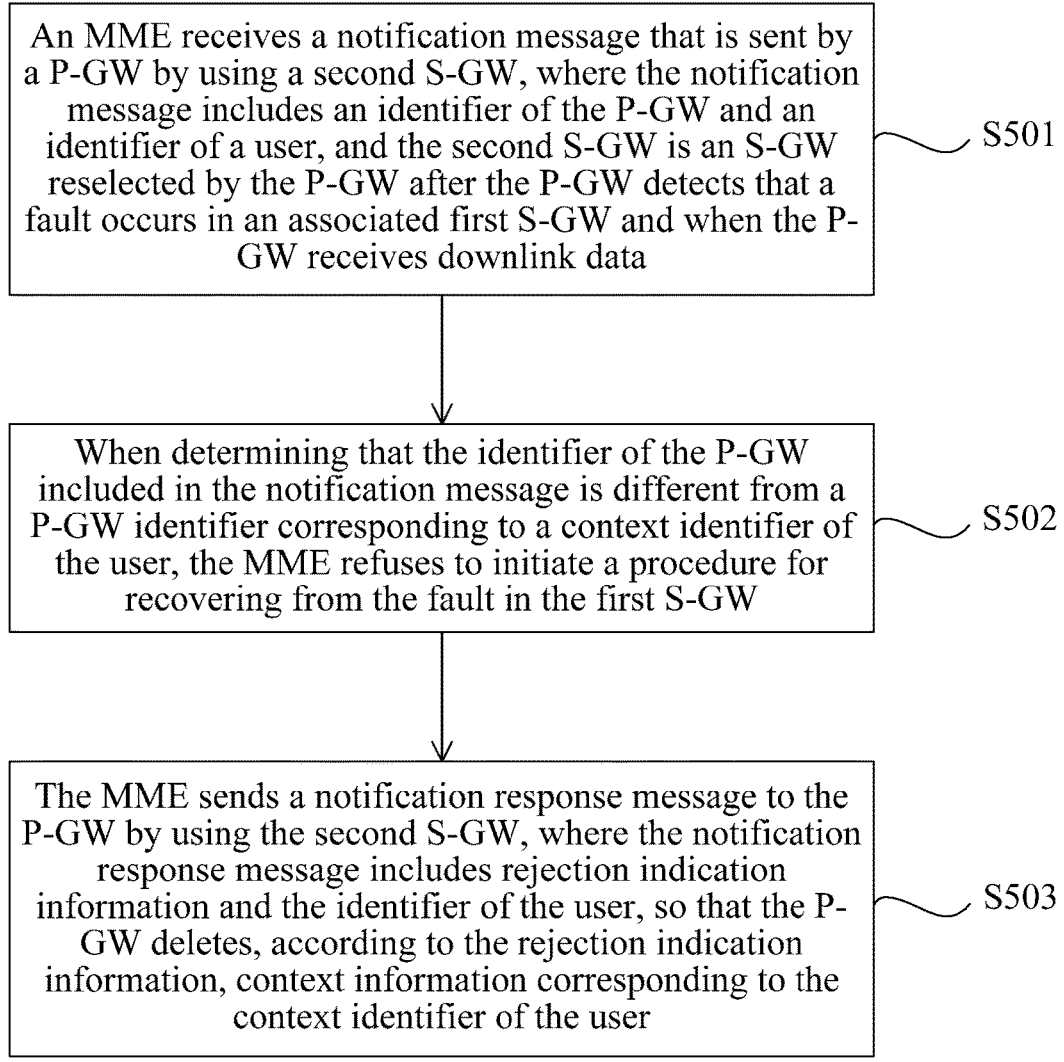
FIG. 5 is a flowchart of a failure handling method according to Embodiment 4 of the present invention.

FIG. 5 is a flowchart of a failure handling method according to Embodiment 4 of the present invention. The method in this embodiment is executed by an MME. The method specifically includes:

Step 501: The MME receives a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data.

Step 502: When determining that the identifier of the P-GW included in the notification message is different from a P-GW identifier corresponding to a context identifier of the user, the MME refuses to initiate a procedure for recovering from the failure in the first S-GW.

Because before the solution in this embodiment is implemented, the first S-GW has established a PDN connection to a reselected P-GW by means of the failure recovery procedure, the identifier of the P-GW stored in the MME is an identifier of the reselected P-GW. When the MME determines that the identifier of the P-GW in the notification message is different from the identifier of the P-GW corresponding to the context identifier of the user, that is, the PDN connection of the context identifier, the first S-GW has been associated with the reselected P-GW and can normally transmit uplink and downlink data of an IP service. Therefore, there is no need to establish a PDN connection between the P-GW and the second S-GW, that is, the recovery procedure does not need to be executed for the failure in the first S-GW.

The solution in this embodiment is a solution that is executed by the MME and corresponds to the solution in the foregoing embodiment. A specific implementation process and a beneficial effect of the solution in this embodiment are similar to those in the foregoing embodiment, and details are not provided again herein.

Further, in the solution in the foregoing embodiment, the identifier of the P-GW is included by the P-GW to the notification message, or is included by the second S-GW to the notification message.

Further, in the solution in the foregoing embodiment, the notification message includes: a downlink triggering notification message for GPRS tunnel protocol, or an update notification message of the PMIP.

In the solution in the foregoing embodiment, the identifier of the P-GW includes at least one of the following identifiers:

an IP address, an F-TEID, and an FQDN of the P-GW.

Further, in the solution shown in the foregoing embodiment, after step 501 in which the MME receives the notification message that is sent by the P-GW by using the second S-GW, the method further includes:

Step 503: The MME sends a notification response message to the P-GW by using the second S-GW, where the notification response message includes rejection indication information and the identifier of the user, so that the P-GW deletes, according to the rejection indication information, context information corresponding to the context identifier of the user.

The rejection indication information includes a reject cause value.

Alternatively, step 503 in the solution in the foregoing embodiment may be:

sending, by the MME, a delete session request message to the P-GW by using the second S-GW, where the delete session request message includes the identifier of the user, so that the P-GW deletes, according to the delete session request message, context information corresponding to the context identifier of the user.

The solution in this embodiment is a solution that is executed by the MME and corresponds to the solution in the foregoing embodiment. A specific implementation process and a beneficial effect of the solution in this embodiment are similar to those in the foregoing embodiment, and details are not provided again herein.

Embodiment 5

Figure 6:
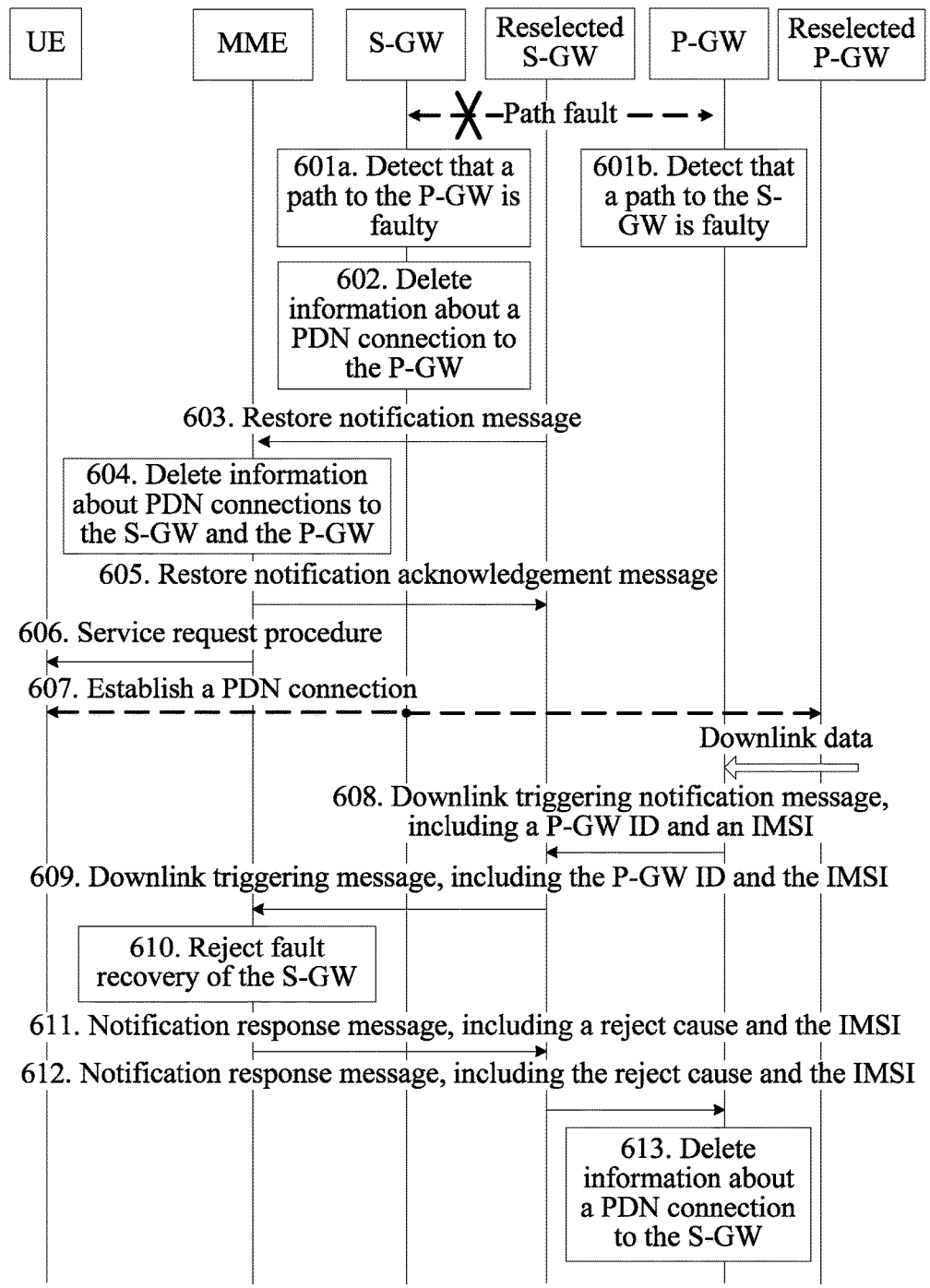
FIG. 6 is a signaling flowchart of a failure handling method according to Embodiment 5 of the present invention.

FIG. 6 is a signaling flowchart of a failure handling method according to Embodiment 5 of the present invention. This embodiment provides exemplary solutions that are interactively executed. As shown in FIG. 6, the method specifically includes the following steps:

Step 601*a*: An S-GW detects that a path to a P-GW is faulty.

Step 601*b*: The P-GW detects that a path to the S-GW is faulty.

Step 601*a* and step 601*b* are performed at the same time.

That the S-GW detects that a path to the P-GW is faulty means that a path failure exists in a direction from the S-GW to the P-GW. Correspondingly, that the P-GW detects that a path to the S-GW path is faulty means that a path failure exists in a direction from the P-GW to the S-GW.

Step 602: The S-GW deletes information about a PDN connection to the P-GW.

The S-GW deletes configuration information related to the PDN connection to the P-GW, that is, deletes the PDN connection to the P-GW.

Step 603: The S-GW sends a restore notification message to an MME.

The restore notification message includes an identifier of the P-GW and an identifier of the S-GW, for example, IP addresses of the P-GW and the S-GW.

Step 604: The MME deletes information about PDN connections to the S-GW and the P-GW.

When receiving the restore notification message, the MME can determine a faulty PDN connection path according to the identifier of the P-GW and the identifier of the S-GW, and then delete the information about the PDN connections to the S-GW and the P-GW. In this step, the MME releases a bearer by deleting the information about the PDN connections, and deletes information related to a UE at the same time.

Step 605: The MME sends a restore notification acknowledgement message to the S-GW.

Step 606: The MME initiates a service request procedure to a UE.

In step 604, the MME deletes connection information related to the UE by deleting the PDN connections, and therefore needs to establish a connection to the UE again in this step.

Step 607: The UE establishes a PDN connection to a reselected P-GW.

The UE may establish, by using a GPRS reattach process, PDN connections to the S-GW and the P-GW that is reselected by the MME for the UE.

In step 601*a* to step 607, the S-GW establishes a PDN connection to the reselected P-GW by means of a failure recovery procedure.

Step 608: The P-GW sends a downlink triggering notification message including a P-GW ID and an IMSI to a reselected S-GW.

When receiving downlink data sent by an external data network, the P-GW performs step 608.

The downlink triggering message is a Downlink Triggering Notification message of the GTP protocol. The P-GW ID may be an IP address, an F-TEID, or an FQDN of the P-GW. A context identifier may correspond to an IP service type of the UE.

Step 609: The reselected S-GW sends the downlink triggering message including the P-GW ID and the IMSI to the MME.

In the solution in this embodiment, the P-GW ID may be included by the P-GW to the downlink triggering message and sent by the reselected S-GW to the MME. Alternatively, the downlink triggering notification message received by the reselected S-GW may not include the P-GW ID, and the reselected S-GW adds the P-GW ID to the downlink triggering notification message and then sends the downlink triggering notification message to the MME.

Step 610: The MME rejects failure recovery of the S-GW.

The MME may perform step 610 when determining through comparison that the P-GW ID in the received downlink triggering notification message and a stored P-GW ID are different.

Step 611: The MME sends a notification response message including a reject cause and the IMSI to the reselected S-GW.

Step 612: The reselected S-GW forwards the notification response message to the P-GW, where the notification response message includes the reject cause and the IMSI.

Step 613: The P-GW deletes information about a PDN connection to the S-GW.

After receiving the notification response message, the P-GW deletes the information about the PDN connection to the S-GW, that is, deletes context information corresponding to a context identifier of the IMSI included in the notification message.

Optionally, in the foregoing solution, the message sent by the MME to the reselected S-GW may be a delete session request message, and accordingly, the delete session request message may include the IMSI. Correspondingly, the reselected S-GW needs to send the delete session request message that includes the IMSI to the P-GW, and the P-GW deletes the information about the PDN connection to the S-GW by deleting a session corresponding to the context identifier of the IMSI.

On the basis of the solution in the foregoing embodiment, the solution in this embodiment provides description by using a specific interactive example, and a specific beneficial effect of the solution is similar to that in the foregoing embodiment.

Figure 7:
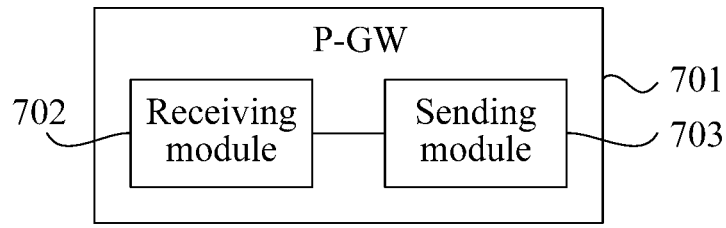
FIG. 7 is a schematic structural diagram of a network device according to Embodiment 6 of the present invention.

FIG. 7 is a schematic structural diagram of a P-GW according to Embodiment 6 of the present invention. As shown in FIG. 7, the packet data network gateway P-GW 701 includes:

a receiving module 702, configured to receive downlink data after detecting that a failure occurs in an associated first S-GW; and a sending module 703, configured to send a notification message to a mobility management entity MME by using a second S-GW, where the notification message includes an identifier of the P-GW and an identifier of a user, so that when determining that the identifier of the P-GW included in the notification message is different from a stored P-GW identifier corresponding to a context identifier of the user, the MME refuses to initiate a procedure for recovering from the failure in the first S-GW.

Further, in the foregoing solution, the identifier of the P-GW is included by the P-GW to the notification message, or is included by the second S-GW to the notification message.

Further, in the foregoing solution, the notification message includes: a downlink triggering notification message for GPRS tunnel protocol, or an update notification message of the PMIP.

Further, in the foregoing solution, the identifier of the P-GW includes at least one of the following identifiers:

an IP address, an F-TEID, and an FQDN of the P-GW.

Further, the receiving module 702 is further configured to: after the sending module 703 sends the notification message to the MME by using the second S-GW, receive a notification response message that is sent by the MME by using the second S-GW, where the notification response message includes rejection indication information and the identifier of the user.

The P-GW 701 further includes:

a first processing module, configured to delete, according to the rejection indication information, context information corresponding to the context identifier of the user.

In the foregoing solution, the rejection indication information includes a reject cause value.

Optionally, the receiving module 702 is further configured to: after the P-GW sends the notification message to the MME by using the second S-GW, receive a delete session request message that is sent by the MME by using the second S-GW, where the delete session request message includes the identifier of the user.

The P-GW 701 further includes:

a second processing module, configured to delete, according to the delete session request message, context information corresponding to the context identifier of the user.

The P-GW provided in the solution in this embodiment can execute the failure handling method executed by the P-GW in the solution in the foregoing embodiment; a specific implementation process and a beneficial effect of the solution in this embodiment are similar to those in the foregoing embodiment, and details are not provided again herein.

Figure 8:
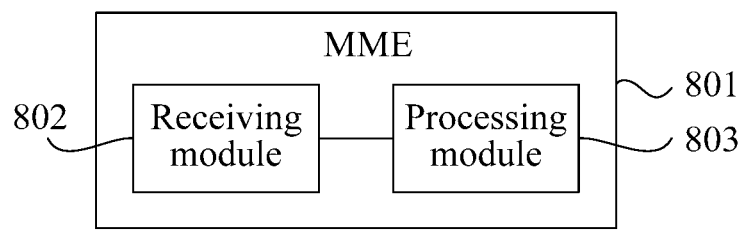
FIG. 8 is a schematic structural diagram of a network device according to Embodiment 7 of the present invention.

FIG. 8 is a schematic structural diagram of an MME according to Embodiment 7 of the present invention. As shown in FIG. 8, the mobility management entity MME 801 includes:

a receiving module 802, configured to receive a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data; and a processing module 803, configured to: when determining that the identifier of the P-GW included in the notification message is different from a P-GW identifier corresponding to a context identifier of the user, refuse to initiate a procedure for recovering from the failure in the first S-GW.

Further, in the foregoing solution, the identifier of the P-GW is included by the P-GW to the notification message, or is included by the second S-GW to the notification message.

Further, in the foregoing solution, the notification message includes: a downlink triggering notification message for GPRS tunnel protocol, or an update notification message of the PMIP.

Further, in the foregoing solution, the identifier of the P-GW includes at least one of the following identifiers:

an IP address, an F-TEID, and an FQDN of the P-GW.

On the basis of the foregoing solution, further, the MME 801 further includes:

a first sending module, configured to: after the receiving module 802 receives the notification message that is sent by the P-GW by using the second S-GW, send a notification response message to the P-GW by using the second S-GW, where the notification response message includes rejection indication information and the identifier of the user, so that the P-GW deletes, according to the rejection indication information, context information corresponding to the context identifier of the user.

The rejection indication information includes a reject cause value.

Alternatively, the MME 801 further includes:

a second sending module, configured to: after the receiving module 802 receives the notification message that is sent by the P-GW by using the second S-GW, send a delete session request message to the P-GW by using the second S-GW, where the delete session request message includes the identifier of the user, so that the P-GW deletes, according to the delete session request message, context information corresponding to the context identifier of the user.

The MME provided in the solution in this embodiment can execute the failure handling method executed by the MME in the solution in the foregoing embodiment; a specific implementation process and a beneficial effect of the solution in this embodiment are similar to those in the foregoing embodiment, and details are not provided again herein.

Figure 9:
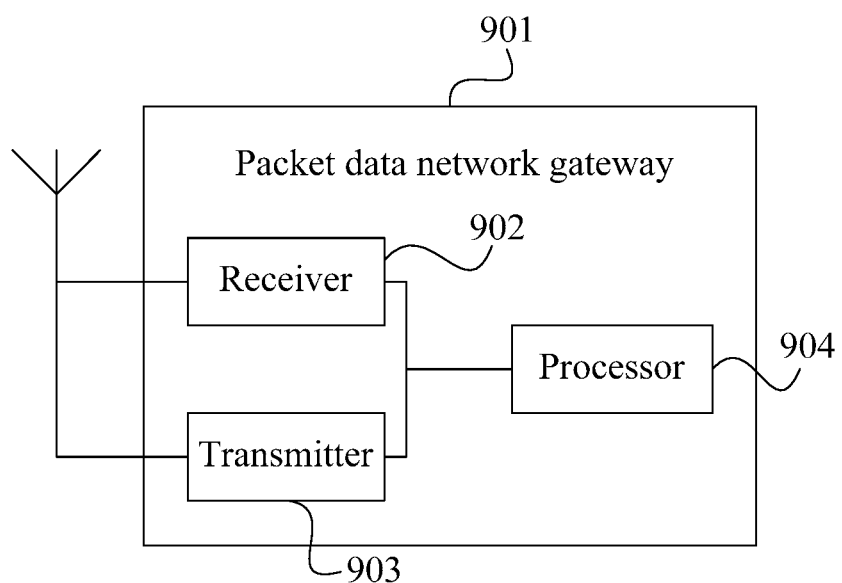
FIG. 9 is a schematic structural diagram of a P-GW according to Embodiment 7 of the present invention.

FIG. 9 is a schematic structural diagram of a P-GW according to Embodiment 7 of the present invention. As shown in FIG. 9, the packet data network gateway 901 includes: a receiver 902, a transmitter 903, and a processor 904, where the receiver 902 is configured to receive downlink data after detecting that a failure occurs in an associated first S-GW; and the transmitter 903 is configured to send a notification message to an MME by using a second S-GW, where the notification message includes an identifier of the P-GW and an identifier of a user, so that when determining that the identifier of the P-GW included in the notification message is different from a P-GW identifier corresponding to a context identifier of the user, the MME refuses to initiate a procedure for recovering from the failure in the first S-GW.

Further, in the foregoing solution, the identifier of the P-GW is included by the P-GW to the notification message, or is included by the second S-GW to the notification message.

In the foregoing solution, the notification message specifically includes:

a downlink triggering notification message for GPRS tunnel protocol, or an update notification message for proxy mobile IP PMIP.

Preferably, the identifier of the P-GW in the solution in the foregoing embodiment includes at least one of the following identifiers:

an Internet Protocol IP address, a fully qualified tunnel endpoint identifier F-TEID, and a fully qualified domain name FQDN of the P-GW.

Further, in the foregoing solution, the receiver 902 is further configured to: after the transmitter 903 sends the notification message to the MME by using the second S-GW, receive a notification response message that is sent by the MME by using the second S-GW, where the notification response message includes rejection indication information and the identifier of the user; and the processor 904 is configured to delete, according to the rejection indication information, context information corresponding to the context identifier of the user.

In the foregoing solution, the rejection indication information includes a reject cause value.

Optionally, in the foregoing solution, the receiver 902 is further configured to: after the transmitter 903 sends the notification message to the MME by using the second S-GW, receive a delete session request message that is sent by the MME by using the second S-GW, where the delete session request message includes the identifier of the user; and the processor 904 is configured to delete, according to the delete session request message, context information corresponding to the context identifier of the user.

The P-GW provided in the solution in this embodiment can execute the failure handling method executed by the P-GW in the solution in the foregoing embodiment; a specific implementation process and a beneficial effect of the solution in this embodiment are similar to those in the foregoing embodiment, and details are not provided again herein.

Figure 10:
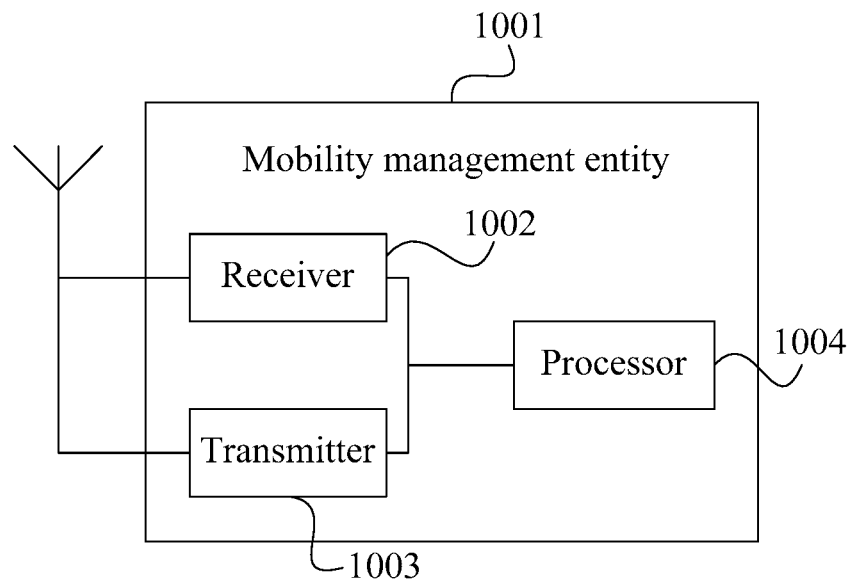
FIG. 10 is a schematic structural diagram of an MME according to Embodiment 8 of the present invention.

FIG. 10 is a schematic structural diagram of an MME according to Embodiment 8 of the present invention. As shown in FIG. 10, the mobility management entity 1001 includes: a receiver 1002, a transmitter 1003, and a processor 1004, where the receiver 1002 is configured to receive a notification message that is sent by a P-GW by using a second S-GW, where the notification message includes an identifier of the P-GW and an identifier of a user, and the second S-GW is an S-GW reselected by the P-GW after the P-GW detects that a failure occurs in an associated first S-GW and when the P-GW receives downlink data; and the processor 1004 is configured to: when determining that the identifier of the P-GW included in the notification message is different from a P-GW identifier corresponding to a context identifier of the user, refuse to initiate a procedure for recovering from the failure in the first S-GW.

In the foregoing solution, the identifier of the P-GW is included by the P-GW to the notification message, or is included by the second S-GW to the notification message.

Further, in the foregoing solution, the notification message specifically includes: a downlink triggering notification message for GPRS tunnel protocol, or an update notification message of the PMIP.

The identifier of the P-GW described above includes at least one of the following identifiers:

an IP address, an F-TEID, and an FQDN of the P-GW.

Further, in the foregoing solution, the transmitter 1003 is configured to send a notification response message to the P-GW by using the second S-GW, where the notification response message includes rejection indication information and the identifier of the user, so that the P-GW deletes, according to the rejection indication information, context information corresponding to the context identifier of the user.

Further, the rejection indication information described above includes a reject cause value.

Optionally, in the foregoing solution, the transmitter 1003 is configured to send a delete session request message to the P-GW by using the second S-GW, where the delete session request message includes the identifier of the user, so that the P-GW deletes, according to the delete session request message, context information corresponding to the context identifier of the user.

The MME provided in the solution in this embodiment can execute the failure handling method executed by the MME in the solution in the foregoing embodiment; a specific implementation process and a beneficial effect of the solution in this embodiment are similar to those in the foregoing embodiment, and details are not provided again herein.

Figure 11:
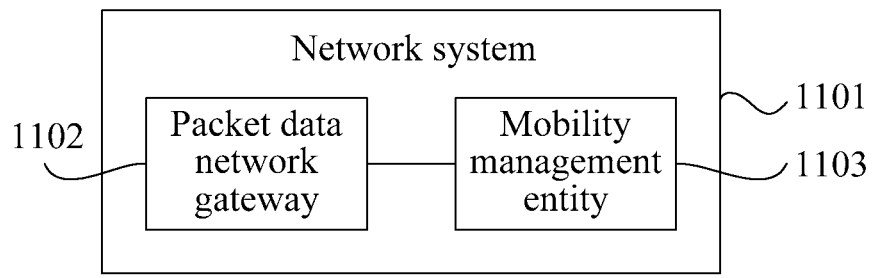
FIG. 11 is a schematic structural diagram of a network system according to Embodiment 9 of the present invention.

Embodiment 9 of the present invention further provides a network system. FIG. 11 is a schematic structural diagram of a network system according to Embodiment 9 of the present invention. As shown in FIG. 11, the network system 1101 includes at least a packet data network gateway 1102 and a mobility management entity 1103. The packet data network gateway 1102 includes any P-GW described in Embodiment 5, and the mobility management entity 1103 includes any MME described in Embodiment 6.

The network system can implement the solutions in the foregoing embodiments; a beneficial effect of the network system is similar to those in the foregoing embodiments, and details are not provided again herein.

Figure 12:
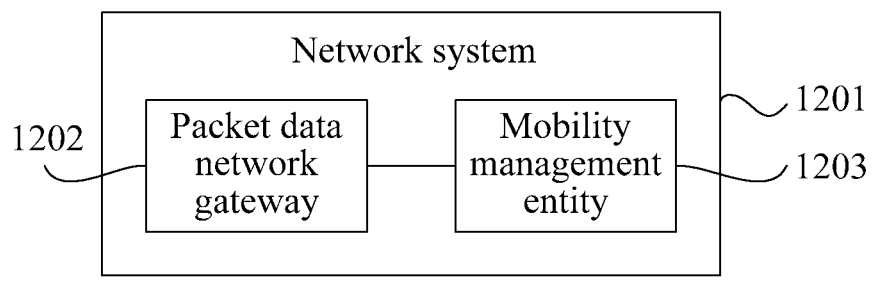
FIG. 12 is a schematic structural diagram of a network system according to Embodiment 10 of the present invention.

Embodiment 10 of the present invention further provides a network system. FIG. 12 is a schematic structural diagram of a network system according to Embodiment 10 of the present invention. As shown in FIG. 12, the network system 1201 includes at least a packet data network gateway 1202 and a mobility management entity 1203. The packet data network gateway 1202 includes any P-GW described in Embodiment 7, and the mobility management entity 123 includes any MME described in Embodiment 8.

The network system can implement the solutions in the foregoing embodiments; a beneficial effect of the network system is similar to those in the foregoing embodiments, and details are not provided again herein.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A failure handling method, comprising:
receiving, by a packet data network gateway (P-GW), downlink data after detecting that a failure occurs in: an associated first serving gateway (S-GW), and on a transmission path between the first S-GW and the P-GW in a packet data network (PDN) connection, wherein the detecting comprises determining that a transmission of a first message between the P-GW and the first S-GW exceeds a retransmission threshold corresponding to a time out of a time started simultaneously with the transmission of the first message;
sending, by the P-GW, a notification message to a mobility management entity (MME) by using a second S-GW different from the first S-GW, wherein:
the notification message comprises an identifier of the P-GW and an identifier of a user; and
the MME stores: a context identifier of the user, and a P-GW identifier of a PDN connection of the user;
determining, by the MME, that the identifier of the P-GW comprised in the notification message is different from:
a P-GW identifier corresponding to the context identifier of the user, or the stored P-GW identifier of the PDN connection of the user; and
in response to determining that the identifier of the P-GW comprised in the notification message is different from:
the P-GW identifier corresponding to the context identifier of the user, or the stored P-GW identifier of the PDN connection of the user:
refusing, by the MME, to initiate a procedure for recovering from the failure.

2. The method according to claim 1, wherein the identifier of the P-GW is included by the P-GW to the notification message, or is included by the second S-GW to the notification message.

3. The method according to claim 1, wherein receiving the downlink data comprises reselecting, by the P-GW, the second S-GW.

4. The method according to claim 1, wherein the identifier of the P-GW comprises at least one of the following identifiers:
an Internet Protocol (IP) address, a fully qualified tunnel endpoint identifier (F-TEID), and a fully qualified domain name (FQDN) of the P-GW.

5. The method according to claim 1, wherein after the sending, by the P-GW, a notification message to an MME by using a second S-GW, the method further comprises:
receiving, by the P-GW, a notification response message that is sent by the MME by using the second S-GW, wherein the notification response message comprises rejection indication information and the identifier of the user; and
deleting, by the P-GW according to the rejection indication information, context information corresponding to the context identifier of the user.

6. A failure handling method, comprising:
receiving, by a mobility management entity (MME), a notification message that is sent by a packet data network gateway (P-GW) by using a second serving gateway (S-GW), wherein:
the notification message comprises an identifier of the P-GW and an identifier of a user;
the second S-GW is an S-GW reselected by the P-GW when the P-GW receives downlink data after detecting, by the P-GW, that a failure occurs in: an associated first S-GW different from the second S-GW, and on a transmission path between the first S-GW and the P-GW in a packet data network (PDN) connection, wherein the detecting comprises determining that a transmission of a first message between the P-GW and the first S-GW exceeds a retransmission threshold corresponding to a time out of a time started simultaneously with the transmission of the first message; and
the MME stores: a context identifier of the user, and a P-GW identifier of a PDN connection of the user;
determining, by the MME, that the identifier of the P-GW comprised in the notification message is different from:
a P-GW identifier corresponding to the context identifier of the user, or the stored P-GW identifier of the PDN connection of the user; and
in response to determining that the identifier of the P-GW comprised in the notification message is different from:
the P-GW identifier corresponding to the context identifier of the user, or the stored P-GW identifier of the PDN connection of the user:
refusing, by the MME, to initiate a procedure for recovering from the failure.

7. The method according to claim 6, wherein the identifier of the P-GW is included by the P-GW to the notification message, or is included by the second S-GW to the notification message.

8. The method according to claim 6, wherein the notification message comprises: a downlink triggering notification message for general packet radio service (GPRS) tunnel protocol (GTP), or an update notification message of the proxy mobile IP (PMIP).

9. The method according to claim 6, wherein after the receiving, by an MME, a notification message that is sent by a P-GW by using a second S-GW, the method further comprises:
sending, by the MME, a notification response message to the P-GW by using the second S-GW, wherein the notification response message comprises rejection indication information and the identifier of the user, so that the P-GW deletes, according to the rejection indication information, context information corresponding to the context identifier of the user.

10. A packet data network gateway (P-GW), comprising: a receiver, a transmitter, and a processor, wherein:
the receiver is configured to receive downlink data after detecting that a failure occurs in: an associated first serving gateway (S-GW), and on a transmission path between the first S-GW and the P-GW in a packet data network (PDN), wherein the detecting comprises determining that a transmission of a first message between the P-GW and the first S-GW exceeds a retransmission threshold corresponding to a time out of a time started simultaneously with the transmission of the first message; and
the transmitter is configured to send a notification message to a mobility management entity (MME) by using a second S-GW different from the first S-GW, wherein:
the notification message comprises an identifier of the P-GW and an identifier of a user,
the MME stores: a context identifier of the user, and a P-GW identifier of a PDN connection of the user; and wherein:
the notification message is sent to the MME to facilitate:
in response to the MME determining that the identifier of the P-GW comprised in the notification message is different from: a P-GW identifier corresponding to the context identifier of the user, or the stored P-GW identifier of the PDN connection of the user, refusing, by the MME, to initiate a procedure for recovering from the failure.

11. The P-GW according to claim 10, wherein the identifier of the P-GW is included by the P-GW to the notification message, or is included by the second S-GW to the notification message.

12. The P-GW according to claim 10, wherein the notification message comprises:
a downlink triggering notification message for general packet radio service (GPRS) tunnel protocol (GTP), or an update notification message for proxy mobile IP (PMIP).

13. The P-GW according to claim 10, wherein, for sending the notification message, the transmitter is further configured to: transmit the notification message to the second S-GW for forwarding, by the second S-GW, to the MME.

14. The P-GW according to a claim 10, wherein
the receiver is further configured to: after the transmitter sends the notification message to the MME by using the second S-GW, receive a notification response message that is sent by the MME by using the second S-GW, wherein the notification response message comprises rejection indication information and the identifier of the user; and
the processor is configured to delete, according to the rejection indication information, context information corresponding to the context identifier of the user.

15. A mobility management entity (MME), comprising: a receiver, a transmitter, and a processor, wherein:
the receiver is configured to receive a notification message that is sent by a packet data network gateway (P-GW) by using a second serving gateway (S-GW), wherein:
the notification message comprises an identifier of the P-GW and an identifier of a user;
the second S-GW is an S-GW reselected by the P-GW when the P-GW receives downlink data after detecting, by the P-GW, that a failure occurs in: an associated first S-GW different from the second S-GW, and on a transmission path between the first S-GW and the P-GW in a packet data network (PDN) connection, wherein the detecting comprises determining that a transmission of a first message between the P-GW and the first S-GW exceeds a retransmission threshold corresponding to a time out of a time started simultaneously with the transmission of the first message; and
the MME stores: a context identifier of the user, and a P-GW identifier of a PDN connection of the user; and
the processor is configured to:
store: a context identifier of the user, and a P-GW identifier of a PDN connection of the user;
determine that the identifier of the P-GW comprised in the notification message is different from: a P-GW identifier corresponding to the context identifier of the user, or the stored P-GW identifier of the PDN connection of the user; and
in response to determining that the identifier of the P-GW comprised in the notification message is different from: the P-GW identifier corresponding to the context identifier of the user, or the stored P-GW identifier of the PDN connection of the user:
refuse to initiate a procedure for recovering from the failure.

16. The MME according to claim 15, wherein the identifier of the P-GW is included by the P-GW to the notification message, or is included by the second S-GW to the notification message.

17. The MME according to claim 15, wherein the notification message comprises: a downlink triggering notification message for general packet radio service (GPRS) tunnel protocol, or an update notification message of the proxy mobile IP (PMIP).

18. The MME according to claim 15 further comprising reserving, by the P-GW, context information corresponding to the PDN connection associated with the first S-GW.

19. The MME according to claim 15, wherein
the transmitter is configured to send a notification response message to the P-GW by using the second S-GW, wherein the notification response message comprises rejection indication information and the identifier of the user, so that the P-GW deletes, according to the rejection indication information, context information corresponding to the context identifier of the user.

20. A network system, comprising at least: a packet data network gateway (P-GW), and a mobility management entity (MME) wherein:
the P-GW is configured to:
receive downlink data after detecting that a failure occurs in: an associated first serving gateway (S-GW), and on a transmission path between the first S-GW and the P-GW in a packet data network (PDN) connection, wherein the detecting comprises determining that a transmission of a first message between the P-GW and the first S-GW exceeds a retransmission threshold corresponding to a time out of a time started simultaneously with the transmission of the first message; and
send a notification message to the MME by using a second S-GW different from the first S-GW, wherein the notification message comprises an identifier of the P-GW and an identifier of a user; and
the MME is configured to:
receive the notification message sent by the P-GW;
store: a context identifier of the user, and a P-GW identifier of a PDN connection of the user;
determine that the identifier of the P-GW comprised in the notification message is different from: a P-GW identifier corresponding to the context identifier of the user, or the stored P-GW identifier of the PDN connection of the user; and
in response to determining that the identifier of the P-GW comprised in the notification message is different from: the P-GW identifier corresponding to the context identifier of the user, or the stored P-GW identifier of the PDN connection of the user:
refuse to initiate a procedure for recovering from the failure.

* * * * *

UNITED STATES PATENT AND TRADEMARK OFFICE
CERTIFICATE OF CORRECTION

PATENT NO. : 10,440,616 B2
APPLICATION NO. : 15/198913
DATED : October 8, 2019
INVENTOR(S) : Shi et al.

Page 1 of 1

It is certified that error appears in the above-identified patent and that said Letters Patent is hereby corrected as shown below:

In the Claims

Claim 20, Column 22, Line 35, "(PDN" should read -- "(PDN)" --

Signed and Sealed this
Seventh Day of April, 2020

Andrei Iancu
*Director of the United States Patent and Trademark Office*